US010250653B2

(12) United States Patent
Cheng et al.

(10) Patent No.: US 10,250,653 B2
(45) Date of Patent: Apr. 2, 2019

(54) PROXIMITY SERVICE SIGNALING PROTOCOL FOR MULTIMEDIA BROADCAST MULTICAST SERVICE OPERATIONS

(71) Applicant: QUALCOMM Incorporated, San Diego, CA (US)

(72) Inventors: Hong Cheng, Basking Ridge, NJ (US); Sudhir Kumar Baghel, Bridgewater, NJ (US); Haris Zisimopoulos, London (GB); Saurabha Rangrao Tavildar, Jersey City, NJ (US); Shailesh Patil, Raritan, NJ (US); Michaela Vanderveen, Tracy, CA (US); Kapil Gulati, Franklin Park, NJ (US); Bilal Sadiq, Basking Ridge, NJ (US)

(73) Assignee: Qualcomm Incorporated, San Diego, CA (US)

( * ) Notice: Subject to any disclaimer, the term of this patent is extended or adjusted under 35 U.S.C. 154(b) by 106 days.

(21) Appl. No.: 15/078,683

(22) Filed: Mar. 23, 2016

(65) Prior Publication Data

US 2016/0285934 A1 Sep. 29, 2016

Related U.S. Application Data

(60) Provisional application No. 62/139,393, filed on Mar. 27, 2015.

(51) Int. Cl.

*H04L 29/06* (2006.01)
*H04W 4/06* (2009.01)

(Continued)

(52) U.S. Cl.

CPC .......... *H04L 65/4076* (2013.01); *H04L 25/20* (2013.01); *H04W 4/06* (2013.01);

(Continued)

(58) Field of Classification Search

CPC ...... H04L 65/4076; H04L 25/20; H04W 4/06; H04W 4/08; H04W 76/002; H04W 76/023

See application file for complete search history.

(56) References Cited

U.S. PATENT DOCUMENTS

| | | | | |
|---|---|---|---|---|
| 2005/0076369 A1* | 4/2005 | Cai | ....................... | H04L 12/185 725/62 |
| 2005/0170842 A1* | 8/2005 | Chen | ..................... | H04L 12/185 455/454 |

(Continued)

FOREIGN PATENT DOCUMENTS

| | | |
|---|---|---|
| EP | 2833694 A2 | 2/2015 |
| WO | WO-2015004142 A1 | 1/2015 |

OTHER PUBLICATIONS

3GPP, "3rd Generation Partnership Project, Technical Specification Group Services and System Aspects, Study on Extended Architecture Support for Proximity-Based Services (Release 13)," 3GPP TR 23.713 V1.0.0 (Feb. 2015) Technical Report, Feb. 2015, 59 pgs., XP_50961131A, 3rd Generation Partnership Project.

(Continued)

*Primary Examiner* — Jenee Holland

(74) *Attorney, Agent, or Firm* — Anthony R. Morris

(57) ABSTRACT

Methods, systems, and devices are describe for signaling protocols for proximity service functions in a wireless communication system. A first wireless device may identify a group identity parameter associated with a multicast transmission of multimedia content. The first wireless device may map the identified group identity parameter to an identification parameter associated with at least one proximity service (ProSe) relay wireless device. The first wireless device may receive the multicast transmission of the multimedia content via the at least one ProSe relay wireless (Continued)

device based on the mapping of the identified group identity parameter to the identification parameter.

29 Claims, 11 Drawing Sheets

(51) Int. Cl.
*H04W 4/08* (2009.01)
*H04L 25/20* (2006.01)
*H04W 76/40* (2018.01)
*H04W 76/14* (2018.01)

(52) U.S. Cl.
CPC .............. *H04W 4/08* (2013.01); *H04W 76/14* (2018.02); *H04W 76/40* (2018.02)

(56) References Cited

U.S. PATENT DOCUMENTS

2007/0117518 A1* 5/2007 Cai .................... H04W 72/005 455/67.13
2007/0117579 A1* 5/2007 Cai .................... H04W 72/005 455/509
2007/0213081 A1* 9/2007 Zhang .................. H04L 12/189 455/466
2008/0146230 A1* 6/2008 Pandian ........... H04W 36/0016 455/436
2009/0168682 A1* 7/2009 Katukam ............. H04L 45/025 370/312
2010/0246467 A1* 9/2010 Song .................... H04W 60/04 370/312
2013/0288668 A1* 10/2013 Pragada ................ H04W 12/06 455/426.1
2013/0301509 A1* 11/2013 Purnadi ............... H04L 65/4076 370/312
2014/0313974 A1* 10/2014 Chandramouli ........ H04W 4/06 370/328
2015/0029866 A1* 1/2015 Liao ..................... H04W 4/008 370/241
2015/0043448 A1* 2/2015 Chatterjee ............. H04W 8/005 370/329
2015/0049684 A1* 2/2015 Kim ...................... H04W 4/008 370/329
2015/0078301 A1* 3/2015 Toth .................... H04W 76/023 370/329
2015/0382159 A1* 12/2015 Kim ........................ H04W 4/08 370/312
2016/0165411 A1* 6/2016 Lee ......................... H04W 4/08 455/426.1
2016/0198516 A1* 7/2016 Kim ...................... H04W 76/14 370/312
2016/0227385 A1* 8/2016 Ahmad ............... H04L 65/4061
2016/0344566 A1* 11/2016 Pudney ................. H04L 12/185
2016/0344726 A1* 11/2016 Stojanovski .......... H04W 76/14

OTHER PUBLICATIONS

HUAWEI, "Prose UE-to-Network Relay with eMBMS," SA WG2 Temporary Document, 3GPP TSG SA WG2 Meeting #105, S2-143238, Sapporo, Japan, Oct. 13-17, 2014, 4 pgs., 3rd Generation Partnership Project.
ISA/EPO, International Search Report and Written Opinion of the International Searching Authority, Int'l App. No. PCT/US2016/023972, Jun. 8, 2016, European Patent Office, Rijswijk, NL, 13 pgs.

* cited by examiner

300

PROXIMITY SERVICE SIGNALING PROTOCOL FOR MULTIMEDIA BROADCAST MULTICAST SERVICE OPERATIONS

CROSS REFERENCES

The present application for patent claims priority to U.S. Provisional Patent Application No. 62/139,393 by Cheng, et al., titled "Proximity Service Signaling Protocol For Multimedia Broadcast Multicast Service Operations," filed Mar. 27, 2015, assigned to the assignee hereof.

BACKGROUND

Field of the Disclosure

The present disclosure, for example, relates to wireless communication systems, and more particularly to signaling protocols to support multimedia broadcast operations in a wireless communication system.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may communicate directly with neighboring UEs using proximity service (ProSe) communication protocols.

A UE (e.g., an edge UE) may move out of coverage area of a base station and, instead, rely on a relay link with a neighboring UE (e.g., a relay UE) to continue communicating with the network. Generally, the edge UE may discover the existence of the neighboring UE using a ProSe discovery process and select the neighboring UE as a relay UE. The edge UE may establish a relay link with the relay UE in order for the traffic from the edge UE to be forwarded to the network, and so that traffic from the network can be relayed to the edge UE. The relay UE may support relay links with more than one edge UEs. Certain traffic types, e.g., multimedia broadcast multicast service (MBMS) traffic, may rely on multicast (one-to-many) transmissions. In the context of a ProSe relay link, it may be beneficial for a relay UE to be able to broadcast the multicast traffic to edge UEs rather than stream the MBMS traffic to each UE individually (e.g., unicast transmission). Current signaling protocols do not support such operations.

SUMMARY

The described features generally relate to one or more improved systems, methods, and/or devices for ProSe signaling protocols in a wireless communication system. Certain aspects of the present description employ a ProSe protocol or stack established on UEs configured to support ProSe operations and, in particular, support multicast streaming from a relay UE to edge UE(s). The ProSe protocol may manage one or more aspects of mapping information associated with a MBMS transmission to ProSe relay link group information to support MBMS transmissions to desired edge UEs. For example, a first UE (or wireless device) may determine or identify a group identity parameter (e.g., a group communication system enabler (GCSE) identifier (ID)) associated with a multicast transmission of multimedia content. The first UE may map the identified group parameter to an identification parameter associated with a ProSe relay UE (or wireless device). The first UE may receive the multicast transmission of the multimedia content via the ProSe relay UE based on the mapping. The ProSe protocol or stack may manage one or more aspects of the first UE, the ProSe relay UE, or both UEs. The relay link may be a wireless ProSe relay link that uses a PC5 communication reference point.

In a first illustrative set of examples, a method for wireless communication is provided. The method may include: identifying, by a first wireless device, a group identity parameter associated with a multicast transmission of multimedia content; mapping the identified group identity parameter to an identification parameter associated with at least one proximity service (ProSe) relay wireless device; and receiving the multicast transmission of the multimedia content via the at least one ProSe relay wireless device based on the mapping of the identified group identity parameter to the identification parameter.

In some aspects, the method may include receiving the multicast transmission of the multimedia content via the at least one ProSe relay wireless device using a PC5 reference point. The identification parameter associated with the at least one ProSe relay wireless device may include a layer 2 (L2) identification of the at least one ProSe relay wireless device. The method may include: receiving a discovery message broadcast from the at least one ProSe relay wireless device; determining that the discovery message comprises an indication that the at least one ProSe relay wireless device supports the multicast transmission of multimedia content associated with the group identity parameter; and selecting the at least one ProSe relay wireless device to receive the multicast transmission of multimedia content. Determining that the discovery message comprises the indication may include determining that the discovery message comprises the group identity parameter.

In some aspects, the method may include: receiving a plurality of discovery messages broadcast from a plurality of ProSe relay wireless devices; determining that the plurality of discovery messages broadcast from the plurality of ProSe relay wireless devices fail to include an indication that the plurality of ProSe relay wireless devices support the multicast transmission of multimedia content associated with the group identity parameter; and sending a request message via a first ProSe relay wireless device in response to the determining, the request message requesting support of the multicast transmission of multimedia content associated with the group identity parameter.

In some aspects, the method may include determining that a subsequent discovery message broadcast from the at least one ProSe relay wireless device comprises an indication that the at least one ProSe relay wireless device supports the multicast transmission of multimedia content associated with the group identity parameter; and selecting the at least one ProSe relay wireless device to receive the multicast transmission of multimedia content. The request message may include at least a message type parameter, or a command parameter, or a group identity parameter listing, or an integrity protection parameter, or a combination thereof.

In some aspects, the at least one ProSe relay wireless device may be the first ProSe relay wireless device. The method may include initiating a ProSe protocol between the first wireless device and the at least one ProSe relay wireless device prior to an initiation of a communication data exchange between the first wireless device and the at least one ProSe relay wireless device.

In some aspects, the method may also include sending a temporary mobile group identity (TMGI) monitor request that comprises the group identification parameter. The method may also include receiving a response from a first ProSe relay wireless device, which response may include the group identification parameter and an indication that the multimedia content is available.

In a second illustrative set of examples, an apparatus for wireless communication is provided. The apparatus may include: a processor; memory in electronic communication with the processor; and instructions stored in the memory. The instructions being executable by the processor to: identify, by a first wireless device, a group identity parameter associated with a multicast transmission of multimedia content; map the identified group identity parameter to an identification parameter associated with at least one proximity service (ProSe) relay wireless device; and receive the multicast transmission of the multimedia content via the at least one ProSe relay wireless device based on the mapping of the identified group identity parameter to the identification parameter.

In some aspects, the apparatus may include instructions executable by the processor to receive the multicast transmission of the multimedia content via the at least one ProSe relay wireless device using a PC5 reference point. The identification parameter associated with the at least one ProSe relay wireless device may include a layer 2 (L2) identification of the at least one ProSe relay wireless device. The apparatus may include instructions executable by the processor to: receive a discovery message broadcast from the at least one ProSe relay wireless device; determine that the discovery message comprises an indication that the at least one ProSe relay wireless device supports the multicast transmission of multimedia content associated with the group identity parameter; and select the at least one ProSe relay wireless device to receive the multicast transmission of multimedia content.

In some aspects, the instructions to determine that the discovery message comprises the indication are further executable by the processor to determine that the discovery message comprises the group identity parameter. The apparatus may include instructions executable by the processor to: receive a plurality of discovery messages broadcast from a plurality of ProSe relay wireless devices; determine that the plurality of discovery messages broadcast from the plurality of ProSe relay wireless devices fail to include an indication that the plurality of ProSe relay wireless devices support the multicast transmission of multimedia content associated with the group identity parameter; and send a request message via a first ProSe relay wireless device in response to the determining, the request message requesting support of the multicast transmission of multimedia content associated with the group identity parameter.

In some aspects, the apparatus may include instructions executable by the processor to: determine that a subsequent discovery message broadcast from the at least one ProSe relay wireless device comprises an indication that the at least one ProSe relay wireless device supports the multicast transmission of multimedia content associated with the group identity parameter; and select the at least one ProSe relay wireless device to receive the multicast transmission of multimedia content. The request message may include at least a message type parameter, or a command parameter, or a group identity parameter listing, or an integrity protection parameter, or a combination thereof. The at least one ProSe relay wireless device may be the first ProSe relay wireless device. The apparatus may include instructions executable by the processor to: initiate a ProSe protocol between the first wireless device and the at least one ProSe relay wireless device prior to an initiation of a communication data exchange between the first wireless device and the at least one ProSe relay wireless device.

In a third illustrative set of examples, an apparatus for wireless communication is provided. The apparatus may include: means for receiving a plurality of discovery messages broadcast from a plurality of ProSe relay wireless devices; means for determining that the plurality of discovery messages broadcast from the plurality of ProSe relay wireless devices fail to include an indication that the plurality of ProSe relay wireless devices support the multicast transmission of multimedia content associated with the group identity parameter; and means for sending a request message via a first ProSe relay wireless device in response to the determining, the request message requesting support of the multicast transmission of multimedia content associated with the group identity parameter.

In some aspects, the apparatus may include means for receiving the multicast transmission of the multimedia content via the at least one ProSe relay wireless device using a PC5 reference point. The identification parameter associated with the at least one ProSe relay wireless device may be a layer 2 (L2) identification of the at least one ProSe relay wireless device. The apparatus may include: means for receiving a discovery message broadcast from the at least one ProSe relay wireless device; means for determining that the discovery message comprises an indication that the at least one ProSe relay wireless device supports the multicast transmission of multimedia content associated with the group identity parameter; and means for selecting the at least one ProSe relay wireless device to receive the multicast transmission of multimedia content.

In some aspects, determining that the discovery message comprises the indication, may include: means for determining that the discovery message comprises the group identity parameter. The apparatus may include: means for receiving a plurality of discovery messages broadcast from a plurality of ProSe relay wireless devices; means for determining that the plurality of discovery messages broadcast from the plurality of ProSe relay wireless devices fail to include an indication that the plurality of ProSe relay wireless devices support the multicast transmission of multimedia content associated with the group identity parameter; and means for sending a request message via a first ProSe relay wireless device in response to the determining, the request message requesting support of the multicast transmission of multimedia content associated with the group identity parameter.

In some aspects, the apparatus may include: means for determining that a subsequent discovery message broadcast from the at least one ProSe relay wireless device comprises an indication that the at least one ProSe relay wireless device supports the multicast transmission of multimedia content associated with the group identity parameter; and means for selecting the at least one ProSe relay wireless device to receive the multicast transmission of multimedia content.

The request message may include at least a message type parameter, or a command parameter, or a group identity parameter listing, or an integrity protection parameter, or a combination thereof.

In some aspects, the at least one ProSe relay wireless device may be the first ProSe relay wireless device. The apparatus may include means for initiating a ProSe protocol between the first wireless device and the at least one ProSe relay wireless device prior to an initiation of a communication data exchange between the first wireless device and the at least one ProSe relay wireless device.

In a fourth illustrative set of examples, a non-transitory computer-readable medium storing computer-executable code for wireless communication is provided. The code executable by a processor to: identify, by a first wireless device, a group identity parameter associated with a multicast transmission of multimedia content; map the identified group identity parameter to an identification parameter associated with at least one proximity service (ProSe) relay wireless device; and receive the multicast transmission of the multimedia content via the at least one ProSe relay wireless device based on the mapping of the identified group identity parameter to the identification parameter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Wireless devices (e.g., UEs) are generally mobile and may, at times, lose connection to a base station, which by extension disconnects the UE from accessing certain network functions. Existing ProSe services generally provide a mechanism for UEs to communicate directly with one another to exchange information, for example. A UE that has lost its connection with a base station may benefit from leveraging a ProSe connection as a relay. For example, an edge UE outside the coverage area of a base station may establish a ProSe connection with a neighboring UE in the coverage area of the base station. The neighboring UE (or relay UE) may provide a relay link to the edge UE that permits the edge UE to reconnect with the base station and, by extension, to network functions. In the situation where the edge UE desires to receive certain types of multicast transmissions, e.g., MBMS transmissions, the edge UE may need to rely on the relay link with a relay UE. This, however, may introduce difficulties for the edge UE as current signaling protocols do not support such multicast traffic routing between the relay UE and the edge UE.

According to aspects of the present description, a ProSe protocol or stack may be established on UEs configured to support ProSe functions. The ProSe protocol may monitor, control, or otherwise manage one or more aspects of mapping information associated with a broadcast transmission of multicast traffic with information associated with a ProSe relay link between an edge UE and a relay UE. This may provide for the relay UE to support a multicast transmission of the multimedia content to associated edge UEs that wish to receive the broadcast traffic. For example, the edge UE may identify a group ID parameter associated with the multicast transmission of the multimedia content. The edge UE may map the identified group ID with an identification parameter associated with a relay UE, e.g., the current relay UE or a different relay UE. The edge UE may receive the multicast transmission of the multimedia content via the relay UE based on the mapping. In some examples, relay UEs may send one or more discovery messages that convey an indication of whether they support the multicast transmission of the multimedia content. If no relay UEs support such transmission, the edge UE may send a request to configure a relay UE to support the multicast transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
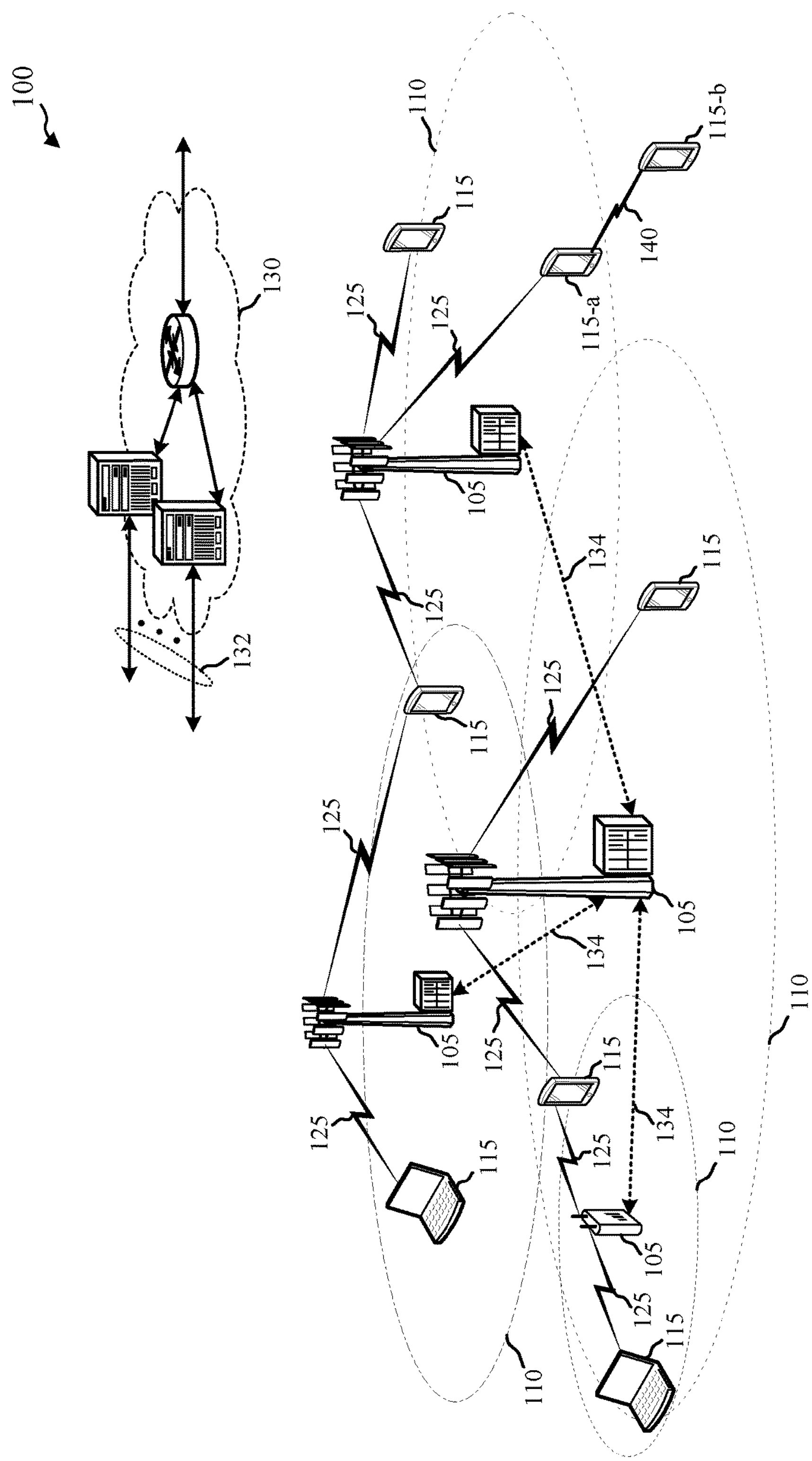
FIG. 1 shows a block diagram of a wireless communication system, in accordance with various aspects of the present disclosure.

FIG. 1 illustrates an example of a wireless communication system 100 in accordance with various aspects of the disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 is an LTE/LTE-A network. In LTE/LTE-A networks, the term evolved Node B (eNB) may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communication system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communication system 100 may support ProSe functions. For example, one or more UEs 115 may include a ProSe protocol stack operating at the non-access stratum (NAS) layer along with one or more other data protocols, e.g., prior to the access stratum (AS) layer including radio access network protocols. The UEs 115 including the ProSe protocol may support relay link functionality to provide network services to a UE 115 that has lost its connection to a base station 105, e.g., left the coverage area 110 of the base station 105. As illustrated in wireless communication system 100, a relay UE 115-*a* may provide a ProSe relay link to an edge UE 115-*b* via a communication link 140. The communication link 140 may be a PC5 communication reference point. Each of UE 115-*a* and UE 115-*b* may include a ProSe protocol stack that manages various aspects of establishing and maintaining the ProSe relay link to support transmissions of various traffic. For example, the UE 115-*b* may identify or otherwise determine that it has a relay requirement and perform a ProSe discovery procedure to identify neighboring UEs 115 that may serve as a relay UE 115. Once the UE 115-*b* has discovered and selected the relay UE 115-*a*, the ProSe protocols on the respective UEs 115-*a* and 115-*b* may establish a relay link via communication link 140 between the edge UE 115-*b* and the relay UE 115-*a*.

In some aspects, the wireless communication system 100 may support signaling protocols for MBMS transmissions between an edge UE (e.g., UE 115-*b*) and a relay UE (e.g., UE 115-*a*). For example, the UE 115-*b* may determine that it wants to receive a multicast transmission of multimedia content (e.g., a user may initiate an application on the UE 115-*b*). The UE 115-*b* may identify a group ID parameter associated with the multicast transmission of the multimedia content, e.g., a group ID issued by a GCSE server that is associated with the particular multimedia content being multicast transmitted. The UE 115-*b* may map the group ID parameter with an identification parameter associated with a ProSe relay UE (e.g., UE 115-*a*). The mapping may be, at least in certain aspects, based on an indication that the ProSe relay UE supports the multicast transmission of the multimedia content. Accordingly, the UE 115-*b* may receive the multicast transmission of the multimedia content from the UE 115-*a* based on the mapping. In the situation where the UE 115-*a* does not currently support the multicast transmission, the UE 115-*b* may send a request to establish such support by the UE 115-*a* or another ProSe relay UE.

Figure 2:
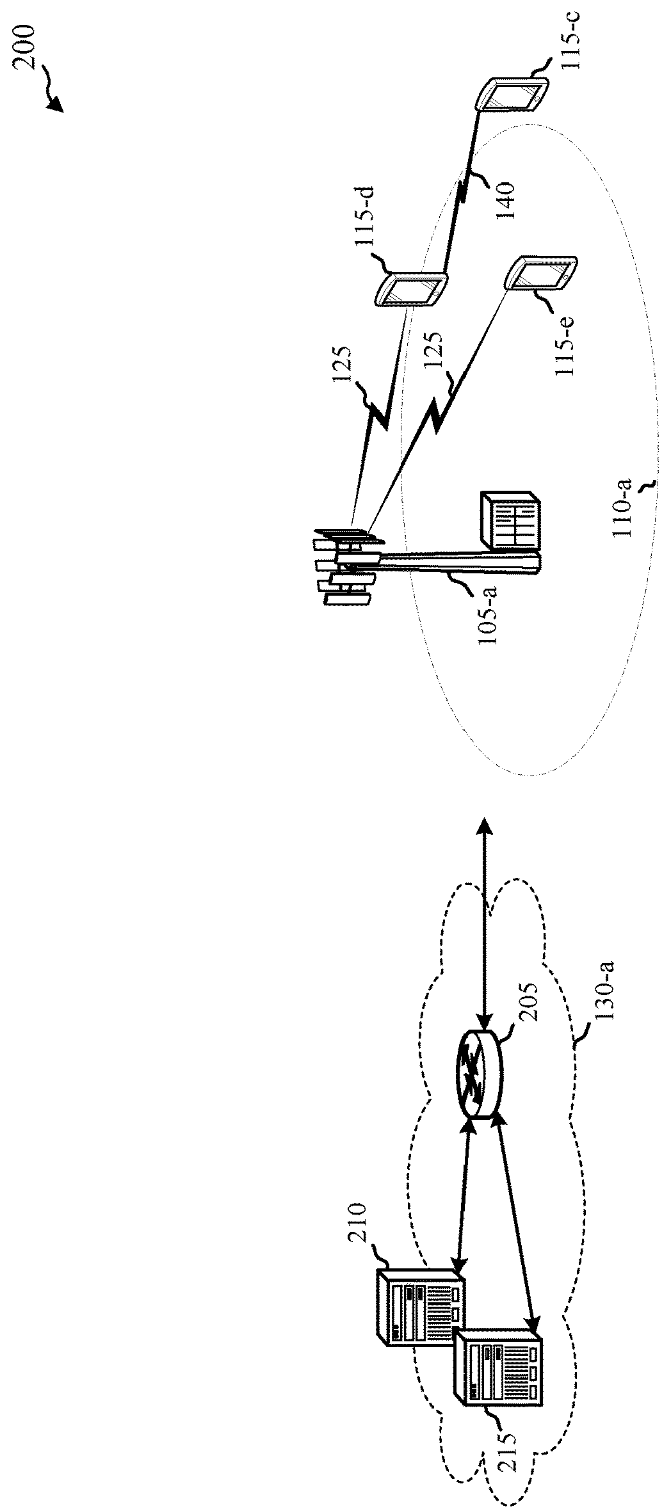
FIG. 2 shows a block diagram of a wireless communication system, in accordance with various aspects of the present disclosure.

FIG. 2 illustrates an example of a wireless communication system 200 in accordance with various aspects of the disclosure. The wireless communication system 200 may implement one or more aspects of the wireless communication system 100 of FIG. 1. The wireless communication system 200 includes a base station 105-*a*, UEs 115, and a core network 130-*a*, each of which may implement aspects of the base stations 105, UEs 115, and core network 130, respectively, of FIG. 1. The core network 130-*a* may include a gateway 205, a GCSE server 210, and a ProSe server 215. The core network 130-*a* may include other components (not shown) associated with providing user authentication, access authorization, tracking, Internet Protocol (IP) connectivity, and other access, routing, or mobility functions.

The gateway 205 may communicate with the base station 105-*a* via a backhaul link and may provide various routing, addressing, etc., functions between the base station 105-*a* and network components. The GCSE server 210 may generally manage one or more aspects of a group ID parameter associated with, for example, a MBMS transmission. For example, the GCSE server 210 may assign a group ID parameter that can be used by UEs 115 interested in receiving the multicast transmission of the multimedia content. The group ID parameter may provide various routing and addressing functions related to the transmission. The ProSe server 215 may manage or control one or more aspects of ProSe communication functions. For example, the ProSe server 215 may manage ProSe communications associated with a ProSe relay link between edge UE 115-*c* and relay UE 115-*d*. Relay UE 115-*e* may also be available to support a ProSe relay link to edge UE 115-*c*. Although FIG. 2 only shows one edge UE 115-*c*, it is to be understood that relay UE 115-*d* and/or relay UE 115-*e* may support a ProSe relay link with more than one edge UE.

Generally, ProSe relay communications between edge UE 115-*c* and relay UE 115-*d* may be associated with an identification parameter provided by the ProSe server 215. In some aspects, the identification parameter for the ProSe relay communications may be used as a layer 2 (L2) ID in the ProSe protocol stack of the UEs 115. Typically, the identification parameter associated with the ProSe communications is independent or otherwise not affiliated with the group ID parameter associated with the multicast transmission of the multimedia content. For example, the GCSE server 210 may generally map the multicast transmission of the multimedia content to a temporary mobile group identity (TMGI) for the particular transmission. The TMGI may be the group ID parameter for the multicast transmission of the multimedia content, e.g., MBMS transmission. Typically, the group ID may be used as an addressing function for UEs interested in receiving the multicast transmission of the multimedia content.

The wireless communication system 200 may support signaling protocols that permit the edge UE 115-*c* to receive a multicast transmission of multimedia content via the relay UE 115-*d* and/or relay UE 115-*e*. In some aspects, the relay UEs 115 (e.g., relay UE 115-*d* and/or relay UE 115-*e*) may support transmission of discovery messages. A first discovery message (DM1) may be sent by all UEs 115 configured to act as a relay UE. The DM1 may include various information access stratum (AS) information such as radio quality information, upper layer information, and the like. A second discovery message (DM2) may be sent by relay UEs 115 that support multicast transmission of multimedia content, e.g., MBMS transmissions. DM2 may include, at least in part, a group ID parameter associated with the multicast transmission of the multimedia content, e.g., the TMGI parameter. In some examples, DM2 may optionally include one or more parameters associated with the ProSe communications, e.g., L2 ID information. The discovery messages may provide an indication of which relay UEs 115 support MBMS transmission.

The edge UE 115-*c* may determine a group ID parameter for a transmission of multimedia content that it is interested in receiving. For example, the edge UE 115-*c* may receive DM1 from one or more relay UEs 115 (e.g., from both of relay UEs 115-*d* and 115-*e*). The edge UE 115-*c* may select a relay UE 115, e.g., relay UE 115-*d* and may associated with the relay UE 115-*d* to establish a ProSe relay link for communications. The edge UE 115-*c* may send one or more messages to the GCSE server 210, via relay UE 115-*d* using ProSe direct communication protocols. For example, the ProSe direct communication protocols may include the edge UE 115-*c* using L2 destination ID set to the relay UE 115-*d* L2 source ID when communicating with relay UE 115-*d*. The edge UE 115-*d* may receive the group ID parameter (e.g., TMGI) from the GCSE server 210 for the multicast transmission of the multimedia content it is interested in receiving. The relay UE 115-*d* may use a L2 destination ID set to the edge UE 115-*c* source ID when communicating with the edge UE 115-*c*.

Once the edge UE 115-*c* knows the group ID parameter for the multicast transmission of the multimedia content, it may participate in a broadcast session to receive the transmission. For example, the edge UE 115-*c* may determine whether any relay UEs 115 are broadcasting DM2 that include information associated with the group ID parameter of interest. If there is at least one relay UE 115 that supports the transmission of interest, the edge UE 115-*c* receives the multicast transmission of the multimedia content from that relay UE 115, e.g., relay UE 115-*d*, by tuning and listening to the L2 destination ID indicated with the DM2.

If, however, there are no relay UEs 115 that currently support the multicast transmission of the multimedia content of interest (e.g., no DM2 indicating such support), the edge UE 115-*c* may request such support. For example, the edge UE 115-*c* may send a ProSe TMGI monitor request to one or more relay UEs 115, e.g., relay UE 115-*d*, to request monitoring for the TMGI of interest. When sending the request, the edge UE 115-*c* may set the L2 destination address to the relay UE 115-*d* L2 source ID. The relay UE 115-*d* may monitor for the corresponding TMGI (e.g., the group ID parameter) broadcast by the network (e.g., the GCSE server 210). When the TMGI is found available, the relay UE 115-*d* may start sending DM2 (in addition to the normal DM1 broadcast) that include information indicative of the TMGI of interest. The relay UE 115-*d* may determine an identification parameter (e.g., a L2 destination ID) associated with the ProSe communication for the multicast transmission. This identification parameter may, for example, be used as a destination address by edge UEs 115 interested in receiving the transmission associated with the TMGI. The relay UE 115-*d* may include information indicative of the group identification parameter in the DM2 broadcast. In some examples, the group identification parameter may be determined by the ProSe server 215 and signaled to the relay UE 115-*d*. The relay UE 115-*d* may join the multicast transmission of the multimedia content (e.g., MBMS transmission) associated with the TMGI, e.g., performing associated MBMS operations. The relay UE 115-*d* may send (relay) the received MBMS traffic to all edge UEs 115 using the L2 destination ID. The edge UE 115-*c* may receive the DM2 broadcast and starts to receive the MBMS transmission by tuning to the L2 destination ID associated with the TMGI.

Figure 3:
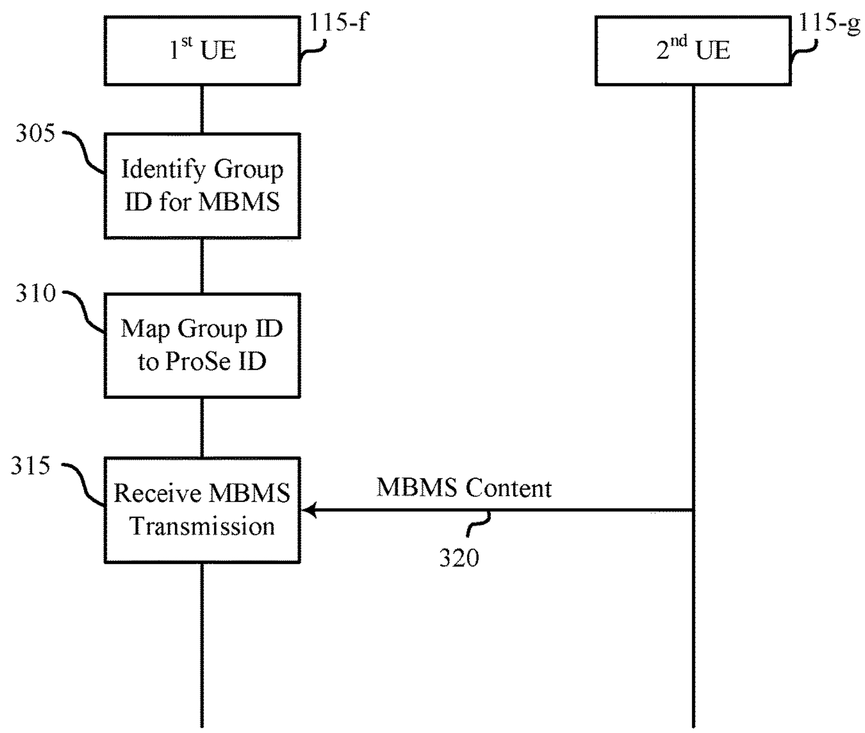
FIG. 3 shows a diagram of aspects of proximity service signaling protocols for use in wireless communication, in accordance with various aspects of the present disclosure.

FIG. 3 is a swim diagram 300 illustrating aspects of ProSe signaling protocol operations, in accordance with various aspects of the present disclosure. The diagram 300 may illustrate aspects of the wireless communication system 100 and/or 200 of FIGS. 1 and 2, respectively. The diagram 300 includes a first UE 115-*f* and a second UE 115-*g*. The first UE 115-*f* and/or the second UE 115-*g* may be examples of one or more of the UEs 115 described above with respect to FIGS. 1 and/or 2. The first UE 115-*f* may be an edge UE and the second UE 115-*g* may be a relay UE. Generally, the diagram 300 illustrates aspects of implementing ProSe signaling protocols for relay operations in wireless communication systems. In some examples, a system device, such as one of the UEs 115 may execute one or more sets of codes to control the functional elements of the device to perform some or all of the functions described below.

At block 305, the first UE 115-*f* may identify a group ID parameter associated with a multicast transmission of multimedia content, e.g., a MBMS transmission. The first UE 115-*f* may identify the group ID parameter based on receiving a DM2 broadcast from the second UE 115-*g*, in some examples.

At block 310, the first UE 115-*f* may map the group ID parameter to an identification parameter associated with at least one ProSe relay wireless device, e.g., the second UE 115-*g*. The group ID parameter may be a L2 destination address provided by the second UE 115-*g* or a ProSe server (e.g., ProSe server 215) and used for ProSe communication for the multicast transmission of the multimedia content. This identification parameter may, for example, be used as a destination address by the first UEs 115-*f* interested in receiving the transmission associated with the group ID parameter (e.g., the TMGI for the MBMS transmission).

At block 315, the first UE 115-*f* may receive the multicast transmission of the multimedia content (e.g., the MBMS content 320) from the second UE 115-*g*. The first UE 115-*f* may tune to the L2 destination ID provided by the second UE 115-*g* to receive the MBMS content 320.

Figure 4:
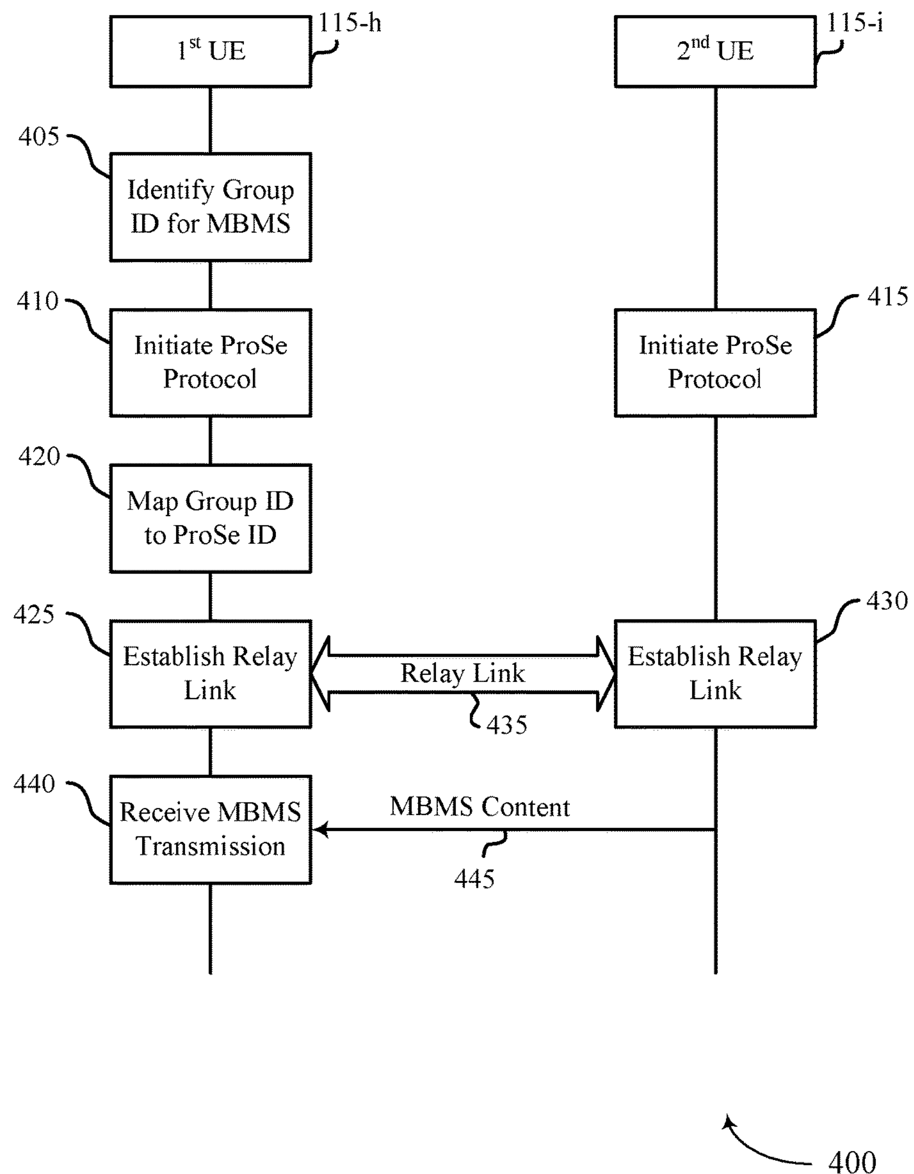
FIG. 4 shows a diagram of aspects of proximity service signaling protocols for use in wireless communication, in accordance with various aspects of the present disclosure.

FIG. 4 is a swim diagram 400 illustrating aspects of ProSe signaling protocol operations, in accordance with various aspects of the present disclosure. The diagram 400 may illustrate aspects of the wireless communication system 100 or 200 described with reference to FIGS. 1 and 2, respectively. The diagram 400 includes a first UE 115-*h* and a second UE 115-*i*. The first UE 115-*h* and/or the second UE 115-*i* may be examples of one or more of the UEs 115 described above with respect to FIGS. 1-3. The first UE 115-*h* may be an edge UE and the second UE 115-*i* may be a relay UE. Generally, the diagram 400 illustrates aspects of implementing ProSe signaling protocols for relay operations in wireless communication systems. In some examples, a system device, such as one of the UEs 115 may execute one or more sets of codes to control the functional elements of the device to perform some or all of the functions described below.

At block 405, the first UE 115-*h* may identify a group ID parameter associated with a multicast transmission of multimedia content, e.g., a MBMS transmission. The first UE 115-*h* may identify the group ID parameter based on receiving a DM2 broadcast from the second UE 115-*g*, in some examples.

At block 410, the first UE 115-*h* may initiate a ProSe protocol. Correspondingly, at block 415 the second UE 115-*i* may also initiate a ProSe protocol. The ProSe protocol or stack may be initiated between the first UE 115-*h* and the second UE 115-*i*. For example, the ProSe protocols may be initiated once the first UE 115-*h* discovers and selects the second UE 115-*i* to provide a ProSe relay link. As discussed, the ProSe protocol may be a higher layer protocol and initiated prior to a communication protocol stack associated with communicating a data exchange between the first UE 115-*h* and the second UE 115-*i*. The ProSe protocol may be a part of the user plane (U-Plane) on the first UE 115-*h* and the second UE 115-*i*. The ProSe protocol may be carried over a lower layer protocol, e.g., the PDCP stack. In some examples, data associated with the ProSe protocol may be identified by a PDCP data unit type field, e.g., service data unit (SDU) and/or protocol data unit (PDU) type field. Accordingly, traffic carried over the PDCP layer may be identified as ProSe protocol traffic and distinguishable from other application protocol traffic.

At block 420, the first UE 115-*h* may map the group ID parameter to an identification parameter associated with at least one ProSe relay wireless device, e.g., the second UE 115-*i*. The group ID parameter may be a L2 destination address provided by the second UE 115-*i* or a ProSe server (e.g., ProSe server 215) and used for ProSe communication for the multicast transmission of the multimedia content. This identification parameter may, for example, be used as a destination address by the first UEs 115-*h* interested in receiving the transmission associated with the group ID parameter (e.g., the TMGI for the MBMS transmission).

At blocks 425 and 430, the first UE 115-*h* and the second UE 115-*i* may establish a wireless relay link 435. The wireless relay link may be established via the ProSe protocols of the respective UEs and may be based, at least in some aspects, on the relay requirement of the first UE 115-*h*. For example, resources associated with the relay link may be based on the nature of the relay link, e.g., bandwidth requirement, throughput requirement, priority of the communications, etc. The wireless relay link may be a PC5 relay link.

At block 440, the first UE 115-*h* may receive the multicast transmission of the multimedia content (e.g., the MBMS content 445) from the second UE 115-*i*. The first UE 115-*h* may tune to the L2 destination ID provided by the second UE 115-*i* to receive the MBMS content 445.

Figure 5:
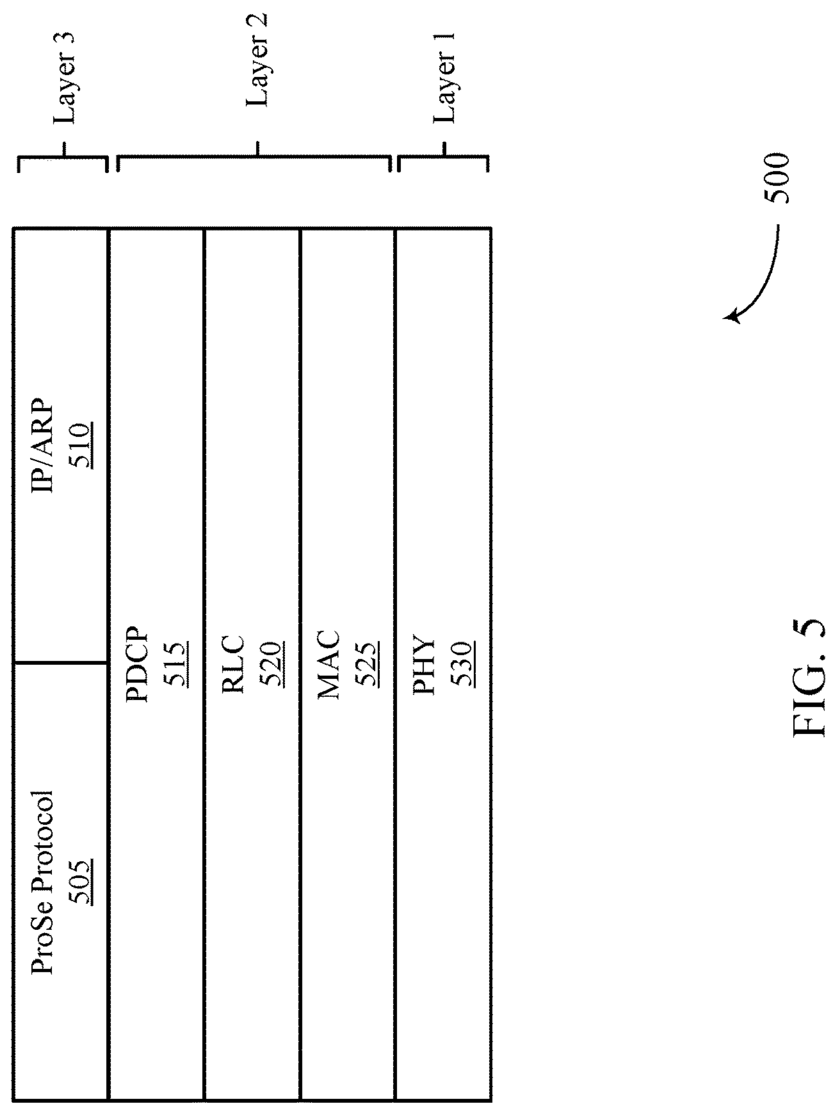
FIG. 5 shows a diagram of aspects of an example proximity service protocol for use in wireless communication, in accordance with various aspects of the present disclosure.

FIG. 5 shows a diagram 500 of aspects of an example of aspects of a ProSe protocol for use in wireless communication, in accordance with various aspects of the present disclosure. The diagram 500 may illustrate aspects of the wireless communication system 100 or 200 described with reference to FIGS. 1 and 2, respectively. Generally, diagram 500 illustrates an example of one or more aspects of a layer structure for an edge UE and/or a relay UE configured to support ProSe functionality. In some examples, a system device, such as one or more UEs 115 described with reference to FIGS. 1-4, may execute one or more sets of codes to control the functional elements of the device to perform some or all of the functions illustrated with respect to diagram 500.

As previously discussed, communication networks that may accommodate some of the various disclosed examples may be packet-based networks that operate according to a layered protocol stack. For example and starting at layer 3, a UE may include a ProSe protocol 505 and an internet protocol/address resolution protocol (IP/ARP) layer 510. Generally, the ProSe protocol 505, the IP/ARP layer 510, as well as one or more other protocols (not shown) may be considered the user plane, NAS, etc., for the UE and may output packet-based traffic to lower layers.

At layer 2, the UE may include a PDCP layer 515, a RLC layer 520, and a MAC layer 525. Communications at the bearer or PDCP layer 515 may be IP-based. The RLC layer 520 may perform packet segmentation and reassembly to communicate over logical channels. The MAC layer 525 may perform priority handling and multiplexing of logical channels into transport channels. The MAC layer 525 may also use HARQ to provide retransmission at the MAC layer 525 to improve link efficiency. At layer 1, the UE may include a physical (PHY) layer 530 where the transport channels may be mapped to Physical channels.

The ProSe protocol 505 may monitor, control, or otherwise manage one or more aspects of ProSe functionality for the UE. For example, the ProSe protocol 505 may manage one or more aspects of establishing and maintaining a wireless relay link for a UE. The ProSe protocol 505 may provide higher layer functionality for the wireless relay link. Traffic associated with the ProSe protocol 505 may include a ProSe type field that identifies and separates the traffic from other layers, e.g., the IP/ARP layer 510. Accordingly, the ProSe type field may provide routing functionality for the ProSe protocol 505 traffic.

The ProSe protocol 505 may also manage one or more aspects of multicast transmission and reception of multimedia content for the UE. For example, the ProSe protocol 505 may manage, at least in some aspects, identifying a group ID parameter associated with the multicast transmission of the multimedia content. The ProSe protocol 505 may map the group ID parameter with an identification parameter associated with a ProSe relay UE and receive the multicast transmission via the ProSe relay UE.

Figure 6:
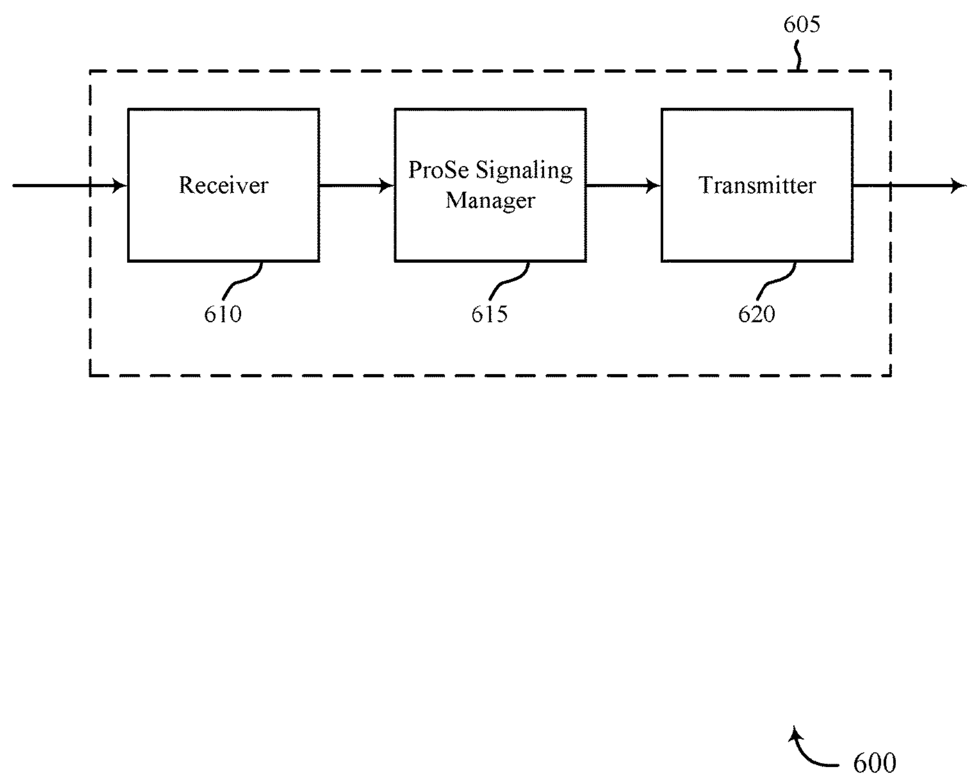
FIG. 6 shows a block diagram of a device configured for use in wireless communication, in accordance with various aspects of the present disclosure.

FIG. 6 shows a block diagram 600 of a device 605 for use in wireless communication, in accordance with various aspects of the present disclosure. The device 605 may be an example of one or more aspects of a UE 115 (e.g., an edge or first UE and/or a relay or second UE) described with reference to FIGS. 1-4. In some examples, the device 605 may implement one or more aspects of the features described with reference to FIG. 5. The device 605 may include a receiver 610, a ProSe signaling manager 615, and/or a transmitter 620. The device 605 may also be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver 610 may receive information such as packets, user data, and/or control information associated with various information channels (e.g., control channels, data channels, etc.). The receiver 610 may be configured to receive transmissions associated with ProSe services (e.g., transmissions associated with a ProSe discovery procedure, a ProSe association process, reception of multicast transmission of multimedia content, etc. Information may be passed on to the ProSe signaling manager 615, and to other components of the device 605.

The ProSe signaling manager 615 may monitor, control, or otherwise manage one or more aspects of signaling for ProSe operations for the device 605. In some examples, the ProSe signaling manager 615 may, alone or in cooperation with other components of the device 605, identify a group ID parameter associated with a multicast transmission of multimedia content. The group ID parameter may be associated with a MBMS service and determined by a GCSE server, for example. The group ID parameter may provide addressing functions for the MBMS transmission. The ProSe signaling manager 615 may map the group ID parameter to an identification parameter associated with at least one ProSe relay wireless device, e.g., a relay UE. The identification parameter may be provided by the relay wireless device, by a ProSe server, and the like. The identification parameter may be used as a L2 ID for ProSe direct communication stack. The ProSe signaling manager 615 may receive the multicast transmission of the multimedia content via the at least one ProSe relay wireless device based, at least in certain aspects, on the mapping of the identified group ID parameter to the identification parameter.

The transmitter 620 may transmit the one or more signals received from other components of the device 605. The transmitter 620 may transmit one or more messages associated with ProSe services for the device, e.g., a ProSe discovery messages, multicast transmission of multimedia content, etc., for the device 605. In some examples, the transmitter 620 may be collocated with the receiver 610 in a transceiver.

Figure 7:
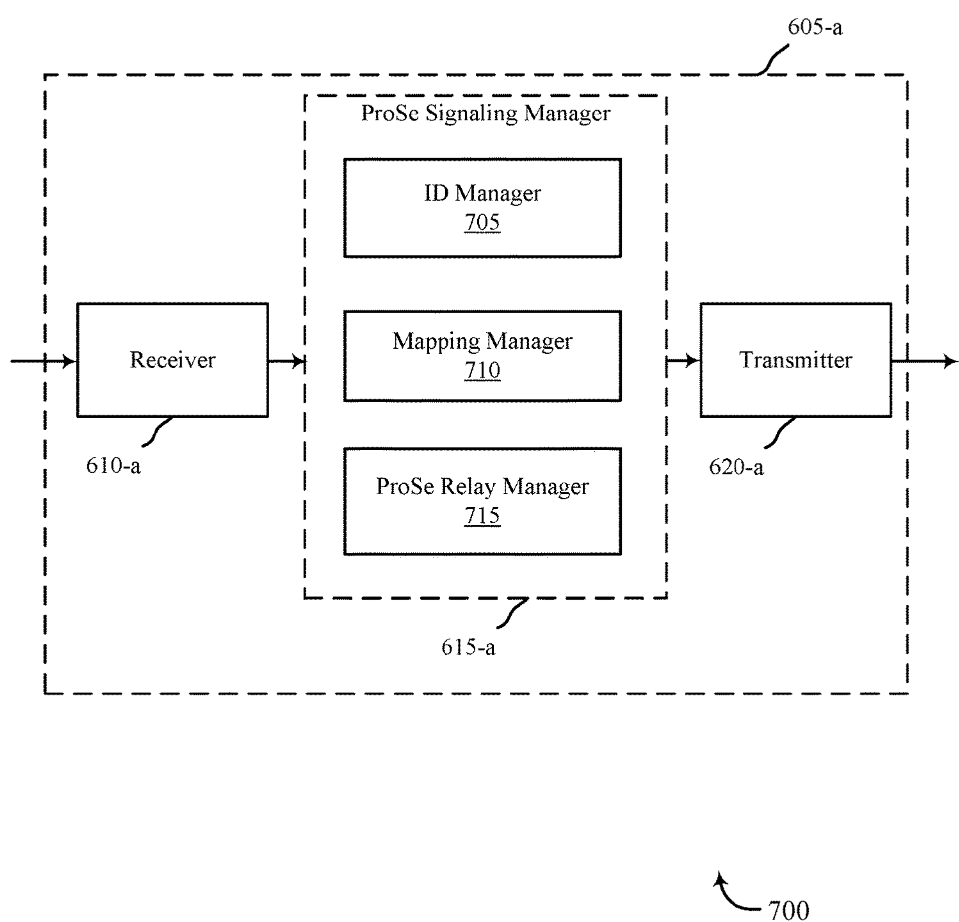
FIG. 7 shows a block diagram of a device configured for use in wireless communication, in accordance with various aspects of the present disclosure.

FIG. 7 shows a block diagram 700 of a device 605-*a* for use in wireless communication, in accordance with various examples. The device 605-*a* may be an example of one or more aspects of a UE 115 (e.g., an edge or first UE and/or a relay or second UE) described with reference to FIGS. 1-4. It may also be an example of a device 605 described with reference to FIG. 6. In some examples, the device 605-*a* may implement one or more aspects of the features described with reference to FIG. 5. The device 605-*a* may include a receiver 610-*a*, a ProSe signaling manager 615-*a*, and/or a transmitter 620-*a*, which may be examples of the corresponding modules of device 605. The device 605-*a* may also include a processor (not shown). Each of these components may be in communication with each other. The ProSe signaling manager 615-*a* may include an ID manager 705, a mapping manager 710, and/or a ProSe relay manager 715. The receiver 610-*a* and the transmitter 620-*a* may perform the functions of the receiver 610 and the transmitter 620, of FIG. 6, respectively.

The ID manager 705 may monitor, control, or otherwise manage one or more aspects of identifying ID parameters or information for the device 605-*a*. For example, the ID manager 705 may identify a group ID parameter associated with a multicast transmission of multimedia content. In some aspects, the ID manager 705 may communicate with one or more servers associated with the multicast transmission of the multimedia content to determine or otherwise identify the group ID parameter. In some aspects, the ID manager 705 may identify the group ID parameter based on receiving one or more discovery messages (e.g., DM2) from a ProSe wireless device (e.g., a relay UE).

In some aspects, the ID manager 705 may, alone or in cooperation with other components of the device 605-*a*, manage one or more aspects of determining or otherwise identifying an identification parameter associated with at least one ProSe relay wireless device (e.g., a relay UE). For example, the identification parameter may be provided by the ProSe relay wireless device, by one or more servers managing aspects of ProSe direct communications, and the like. In some examples, the identification parameter may be a L2 ID of the at least one ProSe wireless device.

The mapping manager 710 may monitor, control, or otherwise manage one or more aspects of mapping ID parameters or information for the device 605-*a*. For example, the mapping manager 710 may map the group ID parameter to the identification parameter associated with the at least one ProSe wireless device.

In some aspects, the mapping manager 710 may, alone or in cooperation with other components of the device 605-*a*, receive a discovery message broadcast for the at least one ProSe relay wireless device. The mapping manager 710 may determine that the discovery message includes an indication that the at least one ProSe relay wireless device supports the multicast transmission of multimedia content associated with the group ID parameter. In some examples, the discovery message may include information associated with the group ID parameter. The mapping manager 710 may select the at least one ProSe relay wireless device to receive the multicast transmission of multimedia content.

In some aspects, the mapping manager 710 may, alone or in cooperation with other components of the device 605-*a*, receive a plurality of discovery messages broadcast from a plurality of ProSe relay wireless devices. The mapping manager 710 may determine that the plurality of discovery messages broadcast from the plurality of ProSe relay wireless devices fail to include an indication that the plurality of ProSe relay wireless devices support the multicast transmission of multimedia content associated with the group identity parameter. That is, mapping manager 710 may determine that none of the relay UEs it is able to communicate with currently supports the multicast transmission of the multimedia content. The mapping manager 710 may send a request message via a first ProSe relay wireless device in response to the determining. The request message may request support of the multicast transmission of multimedia content associated with the group identity parameter. The request message may include at least a message type parameter, or a command parameter, or a group identity parameter listing, or an integrity protection parameter, or a combination thereof.

In some aspects, the mapping manager 710 may then determine that a subsequent discovery message broadcast from the at least one ProSe relay wireless device comprises an indication that the at least one ProSe relay wireless device supports the multicast transmission of multimedia content associated with the group identity parameter. The mapping manager may select the at least one ProSe relay wireless device to receive the multicast transmission of multimedia content. In some examples, the at least one ProSe relay wireless device may be the first ProSe relay wireless device.

The ProSe relay manager 715 may monitor, control, or otherwise manage one or more aspects of a ProSe wireless relay link for the device 605-*a*. For example, the ProSe relay manager 715 may select a ProSe relay wireless device to receive the multicast transmission of multimedia content based, at least in certain aspects, on the mapping of the group ID parameter to the identification parameter associated with the ProSe relay wireless device. The multicast transmission of multimedia content may be received using a PC5 reference point. The ProSe relay manager 715 may use the identification parameter for addressing of the reception of the multicast transmission of multimedia content.

Figure 8:
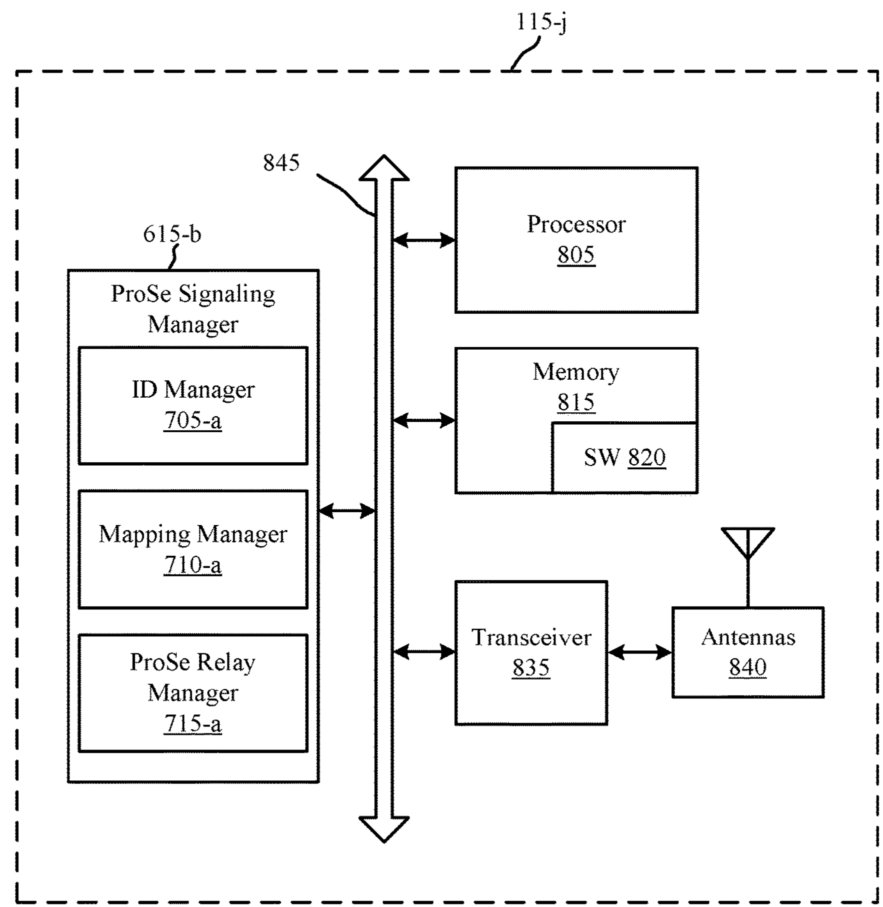
FIG. 8 shows a block diagram of a user equipment for use in wireless communications, in accordance with various aspects of the present disclosure.

FIG. 8 illustrates a block diagram of portions of a system 800 including a user equipment 115-*j* for use in wireless communication, in accordance with various aspects of the present disclosure. In some examples, the UE 115-*j* may be an example of the UEs 115 (e.g., an edge or first UE and/or a relay or second UE) described with respect to FIGS. 1-4, and/or devices 605 of FIGS. 6 and 7. UE 115-*j* may include a ProSe signaling manager 615-*b* which may be an example of and perform the functions of the ProSe signaling manager 615 described with respect to FIGS. 6 and 7. UE 115-*j* may include components for bi-directional voice and data communications including components for transmitting communications and components for receiving communications. For example, UE 115-*j* may communicate bi-directionally with base stations and/or other UEs.

UE 115-*j* may include a processor 805, and memory 815 (e.g., including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station or another UE. The transceiver 835 may include a modem to modulate the packets and provide the modulated packets to the antenna(s) 840 for transmission, and to demodulate packets received from the antenna(s) 840. While UE 115-*a* may include a single antenna 840, UE 115-*j* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., signaling protocols for ProSe services, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.).

The ProSe signaling manager 615-*b* may be configured to perform and/or control some or all of the features and/or functions described with reference to FIGS. 1-7 related to signaling protocols for ProSe operations for the UE 115-*j*. In some examples, the ProSe signaling manager 615-*b* may identify a group ID parameter associated with a multicast transmission of multimedia content, map the group ID parameter to an identification parameter associated with at least one ProSe relay wireless device, and receive the multicast transmission of multimedia content via the at least one ProSe relay wireless device based on the mapping. The ProSe signaling manager 615-*b*, or portions thereof, may include a processor, and/or some or all of the functions of the ProSe signaling manager 615-*b* may be performed by the processor 805 and/or in connection with the processor 805. In some examples, the ProSe signaling manager 615-*b* may be an example of the ProSe signaling manager 615 described with reference to FIGS. 6, and/or 7. For example, the ProSe signaling manager 615-*b* may include an ID manager 705-*a*, a mapping manager 710-*a*, and/or a ProSe relay manager 715-*a*, which may be examples of and perform the functions of the ID manager 705, the mapping manager 710, and/or the ProSe relay manager 715, respectively, described with reference to FIG. 7.

Figure 9:
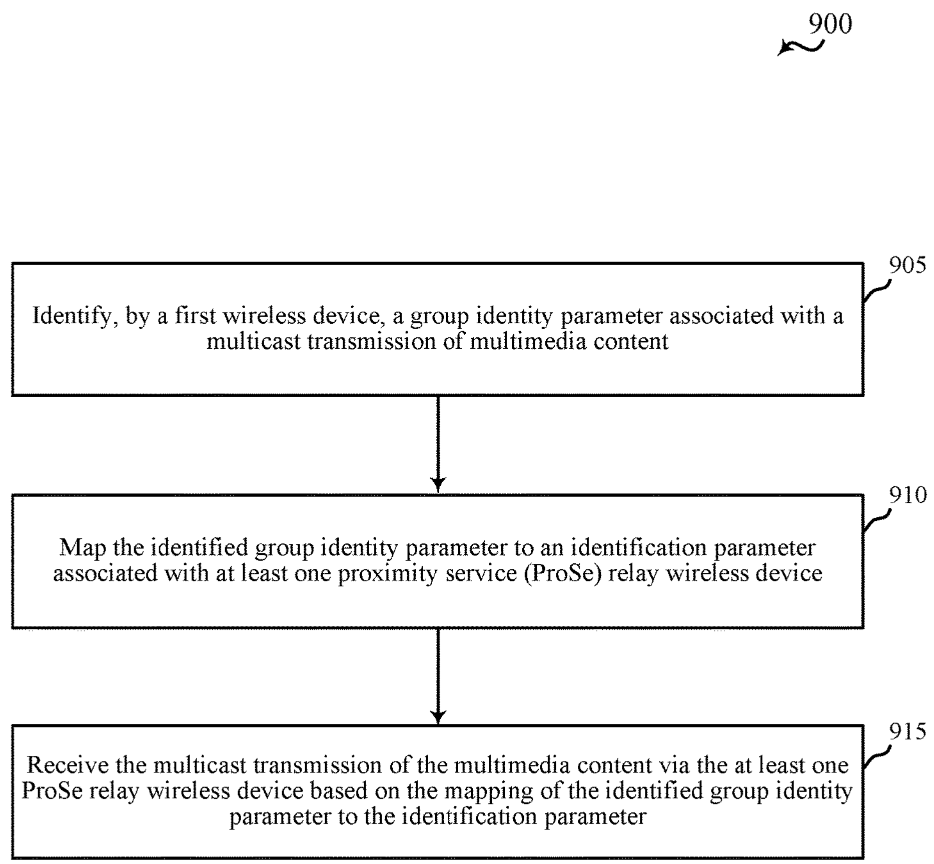
FIG. 9 is a flow chart illustrating an example of a method for wireless communication, in accordance with various aspects of the present disclosure.

FIG. 9 shows a flowchart illustrating a method 900 for wireless communications, in accordance with various aspects of the present disclosure. The operations of method 900 may be implemented by a UE 115 or its components, as described with reference to FIGS. 1-8. For example, the operations of method 900 may be performed by the ProSe signaling manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 900 will be described with reference to a wireless device, such as a UE 115.

At block 905, the method 900 may include identifying, by a first wireless device, a group ID parameter associated with a multicast transmission of multimedia content. The group ID parameter may be, in some examples, be a TMGI parameter associated with MBMS transmissions. One or more GCSE servers may provide information indicative of the group ID parameter.

At block 910, the method 900 may include mapping the group ID parameter to an identification parameter associated with at least one ProSe relay wireless device. The identification parameter may be a L2 ID parameter associated with the ProSe relay wireless device. Mapping the group ID parameter to the identification parameter associated with the ProSe relay wireless device may provide an indication that the ProSe relay wireless device may support the multicast transmission of the multimedia content. In some examples, mapping the group ID parameter to the identification parameter may be based, at least in some aspects, on receiving one or more discovery messages from the ProSe relay wireless device. The discovery message (e.g., DM2) may include information associated with the group ID parameter and, in some examples, the identification parameter associated with the ProSe relay wireless device.

At block 915, the method 900 may include receiving the multicast transmission of the multimedia content via the at least one ProSe relay wireless device based on the mapping the group ID parameter to the identification parameter. The multicast transmission of multimedia content may be received from the ProSe relay wireless device using a PC5 reference point.

The operation(s) at blocks 905, 910, and/or 915 may be performed using the ProSe signaling manager 615 described with reference to FIGS. 6-8.

Thus, the method 900 may provide for wireless communication. It should be noted that the method 900 is just one implementation and that the operations of the method 900 may be rearranged or otherwise modified such that other implementations are possible.

Figure 10:
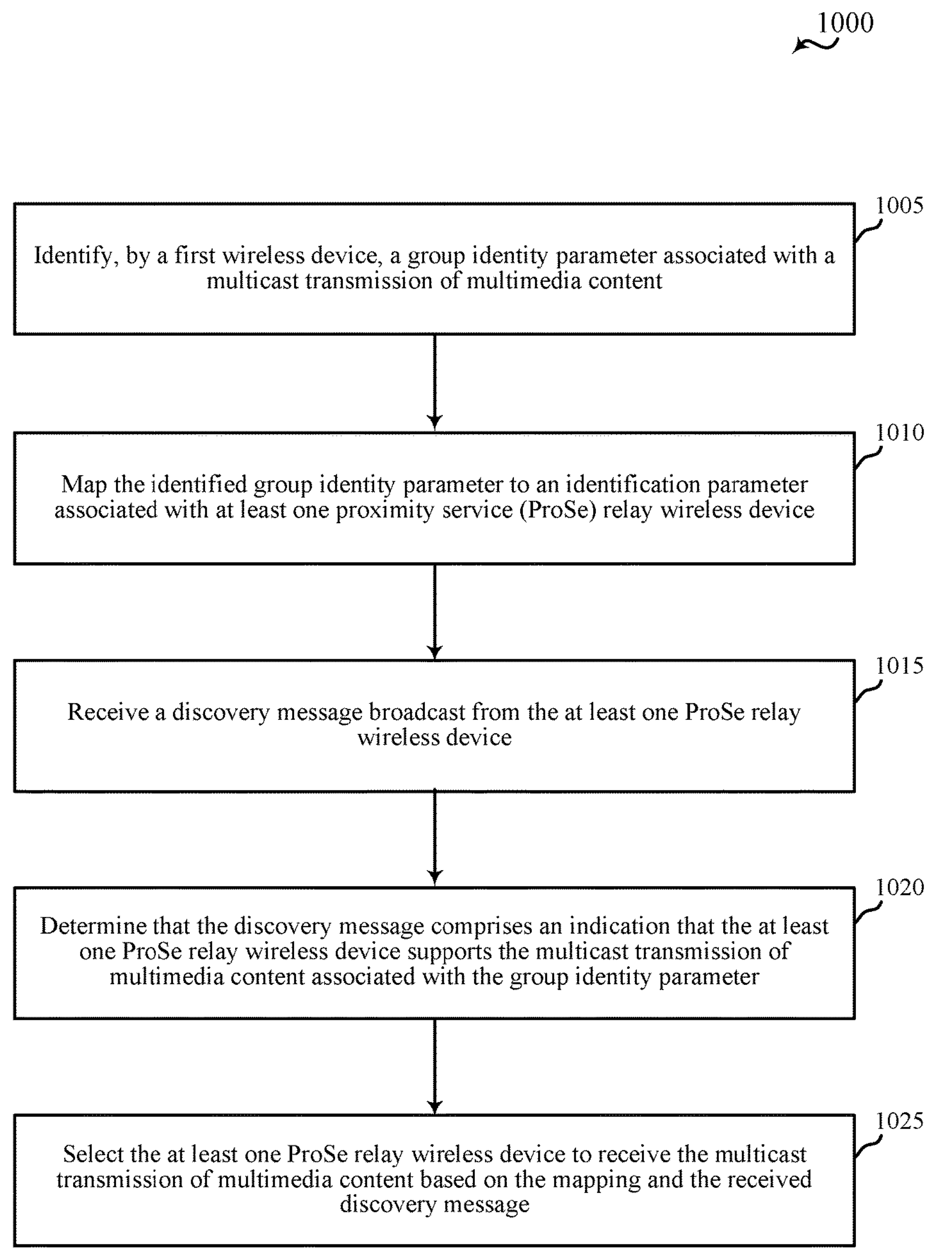
FIG. 10 is a flow chart illustrating another example of a method for wireless communication, in accordance with various aspects of the present disclosure.

FIG. 10 shows a flowchart illustrating a method 1000 for wireless communications, in accordance with various aspects of the present disclosure. The operations of method 1000 may be implemented by a UE 115 or its components, as described with reference to FIGS. 1-8. For example, the operations of method 1000 may be performed by the ProSe signaling manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 1000 will be described with reference to a wireless device, such as a UE 115.

At block 1005, the method 1000 may include identifying, by a first wireless device, a group ID parameter associated with a multicast transmission of multimedia content. The group ID parameter may be, in some examples, be a TMGI parameter associated with MBMS transmissions. One or more GCSE servers may provide information indicative of the group ID parameter.

At block 1010, the method 1000 may include mapping the group ID parameter to an identification parameter associated with at least one ProSe relay wireless device. The identification parameter may be a L2 ID parameter associated with the ProSe relay wireless device. Mapping the group ID parameter to the identification parameter associated with the ProSe relay wireless device may provide an indication that the ProSe relay wireless device may support the multicast transmission of the multimedia content. In some examples, mapping the group ID parameter to the identification parameter may be based, at least in some aspects, on receiving one or more discovery messages from the ProSe relay wireless device. The discovery message (e.g., DM2) may include information associated with the group ID parameter and, in some examples, the identification parameter associated with the ProSe relay wireless device.

At block 1015, the method 1000 may include receiving a discovery message broadcast from the at least one ProSe relay wireless device. The discovery message may be a DM2, as described above.

At block 1020, the method 1000 may include determining that the discovery message includes an indication that the at least one ProSe relay wireless device supports the multicast transmission of multimedia content associated with the group ID parameter. In some examples, the discovery message may include the group ID parameter and, in some aspects, the identification parameter associated with the ProSe relay wireless device.

At block 1025, the method 1000 may include selecting the at least one ProSe relay wireless device to receive the multicast transmission of multimedia content based on the mapping the group ID parameter to the identification parameter and the received discovery message. The multicast transmission of multimedia content may be received from the ProSe relay wireless device using a PC5 reference point.

The operation(s) at blocks 1005, 1010, 1015, 1020 and/or 1025 may be performed using the ProSe signaling manager 615 described with reference to FIGS. 6-8.

Thus, the method 1000 may provide for wireless communication. It should be noted that the method 1000 is just one implementation and that the operations of the method 1000 may be rearranged or otherwise modified such that other implementations are possible.

Figure 11:
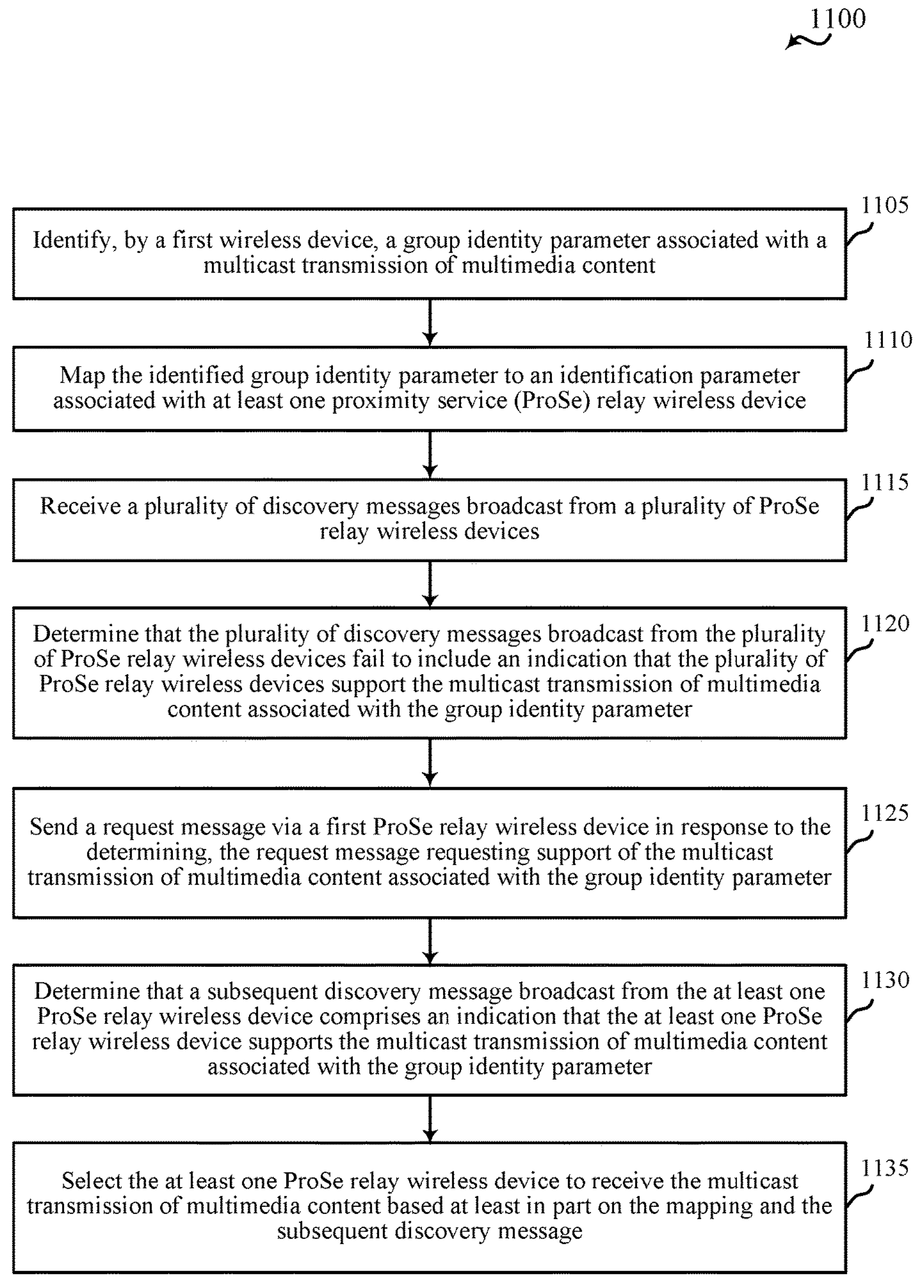
FIG. 11 is a flow chart illustrating another example of a method for wireless communication, in accordance with various aspects of the present disclosure.

FIG. 11 shows a flowchart illustrating a method 1100 for wireless communications, in accordance with various aspects of the present disclosure. The operations of method 1100 may be implemented by a UE 115 or its components, as described with reference to FIGS. 1-8. For example, the operations of method 1100 may be performed by the ProSe signaling manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 1100 will be described with reference to a wireless device, such as a UE 115.

At block 1105, the method 1100 may include identifying, by a first wireless device, a group ID parameter associated with a multicast transmission of multimedia content. The group ID parameter may be, in some examples, be a TMGI parameter associated with MBMS transmissions. One or more GCSE servers may provide information indicative of the group ID parameter.

At block 1110, the method 1100 may include mapping the group ID parameter to an identification parameter associated with at least one ProSe relay wireless device. The identification parameter may be a L2 ID parameter associated with the ProSe relay wireless device. Mapping the group ID parameter to the identification parameter associated with the ProSe relay wireless device may provide an indication that the ProSe relay wireless device may support the multicast transmission of the multimedia content. In some examples, mapping the group ID parameter to the identification parameter may be based, at least in some aspects, on receiving one or more discovery messages from the ProSe relay wireless device. The discovery message (e.g., DM2) may include information associated with the group ID parameter and, in some examples, the identification parameter associated with the ProSe relay wireless device.

At block 1115, the method 1100 may include receiving a plurality of discovery messages broadcast from a plurality of ProSe relay wireless devices. The plurality of discovery messages may be a DM2, as described above.

At block 1120, the method 1100 may include determining that the plurality of discovery messages broadcast from the plurality of ProSe relay wireless devices fail to include an indication that the plurality of ProSe relay wireless devices support the multicast transmission of multimedia content associated with the group ID parameter. In some examples, the plurality of discovery message may not include the group ID parameter associated with the multicast transmission of multimedia content.

At block 1125, the method 1100 may include sending a request message via a first ProSe relay wireless device in response to the determining, the request message requesting support of the multicast transmission of multimedia content associated with group ID parameter.

At block 1130, the method 1100 may include determining that a subsequent discovery message broadcast from the at least one ProSe relay wireless devices includes an indication that the at least one ProSe relay wireless device supports the multicast transmission of multimedia content associated with the group ID parameter. The subsequent discovery message may include the group ID parameter and, in some aspects, the identification parameter associated with the ProSe relay wireless device.

At block 1135, the method 1100 may include selecting the at least one ProSe relay wireless device to receive the multicast transmission of multimedia content based on the mapping the group ID parameter to the identification parameter and the received subsequent discovery message. The multicast transmission of multimedia content may be received from the ProSe relay wireless device using a PC5 reference point.

The operation(s) at blocks 1105, 1110, 1115, 1120, 1125, 1130, and/or 1135 may be performed using the ProSe signaling manager 615 described with reference to FIGS. 6-8.

Thus, the method 1100 may provide for wireless communication. It should be noted that the method 1100 is just one implementation and that the operations of the method 1100 may be rearranged or otherwise modified such that other implementations are possible.

In some examples, aspects from two or more of the methods 900-1100 may be combined. It should be noted that the methods 900, etc. are just example implementations, and that the operations of the methods 900-1100 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:

receiving a discovery message broadcast from at least one ProSe relay wireless device;

identifying, by a first wireless device, a group identity parameter associated with a multicast transmission of multimedia content;

determining that the discovery message comprises an indication of whether the at least one ProSe relay wireless device supports the multicast transmission of multimedia content associated with the group identity parameter;

sending a temporary mobile group identity (TMGI) monitor request that comprises the group identity parameter;

receiving, in response to the TMGI monitor request, a response from the at least one first ProSe relay wireless device, wherein the response comprises an identification parameter associated with the at least one ProSe relay wireless device;

mapping the identified group identity parameter to the identification parameter; and receiving, subsequent to the determining, the multicast transmission of the multimedia content via the at least one ProSe relay wireless device based on the mapping of the identified group identity parameter to the identification parameter.

2. The method of claim 1, further comprising:

receiving the multicast transmission of the multimedia content via the at least one ProSe relay wireless device using a PC5 reference point.

3. The method of claim 1, wherein the identification parameter associated with the at least one ProSe relay wireless device comprises a layer 2 (L2) identification of the at least one ProSe relay wireless device.

4. The method of claim 1, further comprising:

determining, based at least in part on the indication, that the at least one ProSe relay wireless device supports the multicast transmission of multimedia content associated with the group identity parameter; and selecting, based at least in part on the determination that the at least one ProSe relay wireless devices supports the multicast transmission of multimedia content, the at least one ProSe relay wireless device to receive the multicast transmission of multimedia content.

5. The method of claim 4, wherein determining that the discovery message comprises the indication, comprises:

determining that the discovery message comprises the group identity parameter.

6. The method of claim 1, further comprising:

receiving a plurality of discovery messages broadcast from a plurality of ProSe relay wireless devices;

determining that the plurality of discovery messages broadcast from the plurality of ProSe relay wireless devices fail to include an indication that the plurality of ProSe relay wireless devices support the multicast transmission of multimedia content associated with the group identity parameter; and sending a request message via a first ProSe relay wireless device in response to the determining, the request message requesting support of the multicast transmission of multimedia content associated with the group identity parameter.

7. The method of claim 6, further comprising:

determining that a subsequent discovery message broadcast from the at least one ProSe relay wireless device comprises an indication that the at least one ProSe relay wireless device supports the multicast transmission of multimedia content associated with the group identity parameter; and selecting the at least one ProSe relay wireless device to receive the multicast transmission of multimedia content.

8. The method of claim 6, wherein the request message comprises at least a message type parameter, or a command parameter, or a group identity parameter listing, or an integrity protection parameter, or a combination thereof.

9. The method of claim 6, wherein the at least one ProSe relay wireless device is the first ProSe relay wireless device.

10. The method of claim 1, wherein the response further comprises an indication that the multimedia content is available.

11. The method of claim 1, further comprising:

initiating a ProSe protocol between the first wireless device and the at least one ProSe relay wireless device prior to an initiation of a communication data exchange between the first wireless device and the at least one ProSe relay wireless device.

12. An apparatus for wireless communication, comprising:

a processor;

memory in electronic communication with the processor; and instructions stored in the memory, the instructions being executable by the processor to:

receive a discovery message broadcast from at least one ProSe relay wireless device;

identify, by a first wireless device, a group identity parameter associated with a multicast transmission of multimedia content;

determine that the discovery message comprises an indication of whether the at least one ProSe relay wireless device supports the multicast transmission of multimedia content associated with the group identity parameter;

send a temporary mobile group identity (TMGI) monitor request that comprises the group identity parameter;

receive, in response to the TMGI monitor request, a response from the at least one first ProSe relay wireless device, wherein the response comprises an identification parameter associated with the at least one ProSe relay wireless device;

map the identified group identity parameter to the identification parameter; and receive, subsequent to the determining, the multicast transmission of the multimedia content via the at least one ProSe relay wireless device based on the mapping of the identified group identity parameter to the identification parameter.

13. The apparatus of claim 12, further comprising instructions executable by the processor to:

receive the multicast transmission of the multimedia content via the at least one ProSe relay wireless device using a PC5 reference point.

14. The apparatus of claim 12, wherein the identification parameter associated with the at least one ProSe relay wireless device comprises a layer 2 (L2) identification of the at least one ProSe relay wireless device.

15. The apparatus of claim 12, further comprising instructions executable by the processor to:

determine, based at least in part on the indication, that the at least one ProSe relay wireless device supports the multicast transmission of multimedia content associated with the group identity parameter; and select, based at least in part on the determination that the at least one ProSe relay wireless devices supports the multicast transmission of multimedia content, the at least one ProSe relay wireless device to receive the multicast transmission of multimedia content.

16. The apparatus of claim 15, wherein the instructions to determine that the discovery message comprises the indication are further executable by the processor to:

determine that the discovery message comprises the group identity parameter.

17. The apparatus of claim 12, further comprising instructions executable by the processor to:

receive a plurality of discovery messages broadcast from a plurality of ProSe relay wireless devices;

determine that the plurality of discovery messages broadcast from the plurality of ProSe relay wireless devices fail to include an indication that the plurality of ProSe relay wireless devices support the multicast transmission of multimedia content associated with the group identity parameter; and send a request message via a first ProSe relay wireless device in response to the determining, the request message requesting support of the multicast transmission of multimedia content associated with the group identity parameter.

18. The apparatus of claim 17, further comprising instructions executable by the processor to:

determine that a subsequent discovery message broadcast from the at least one ProSe relay wireless device comprises an indication that the at least one ProSe relay wireless device supports the multicast transmission of multimedia content associated with the group identity parameter; and select the at least one ProSe relay wireless device to receive the multicast transmission of multimedia content.

19. The apparatus of claim 17, wherein the request message comprises at least a message type parameter, or a command parameter, or a group identity parameter listing, or an integrity protection parameter, or a combination thereof.

20. The apparatus of claim 17, wherein the at least one ProSe relay wireless device is the first ProSe relay wireless device.

21. The apparatus of claim 12, further comprising instructions executable by the processor to:

initiate a ProSe protocol between the first wireless device and the at least one ProSe relay wireless device prior to an initiation of a communication data exchange between the first wireless device and the at least one ProSe relay wireless device.

22. An apparatus for wireless communication, comprising:

means for receiving a discovery message broadcast from at least one ProSe relay wireless device;

means for identifying, by a first wireless device, a group identity parameter associated with a multicast transmission of multimedia content;

means for determining that the discovery message comprises an indication of whether the at least one ProSe relay wireless device supports the multicast transmission of multimedia content associated with the group identity parameter;

means for sending a temporary mobile group identity (TMGI) monitor request that comprises the group identity parameter;

means for receiving, in response to the TMGI monitor request, a response from the at least one first ProSe relay wireless device, wherein the response comprises an identification parameter associated with the at least one ProSe relay wireless device;

means for mapping the identified group identity parameter to the identification parameter; and means for receiving, subsequent to the determining, the multicast transmission of the multimedia content via the at least one ProSe relay wireless device based on the mapping of the identified group identity parameter to the identification parameter.

23. The apparatus of claim 22, further comprising:

means for receiving the multicast transmission of the multimedia content via the at least one ProSe relay wireless device using a PC5 reference point.

24. The apparatus of claim 22, wherein the identification parameter associated with the at least one ProSe relay wireless device comprises a layer 2 (L2) identification of the at least one ProSe relay wireless device.

25. The apparatus of claim 22, further comprising:

means for determining, based at least in part on the indication, that the at least one ProSe relay wireless device supports the multicast transmission of multimedia content associated with the group identity parameter; and means for selecting, based at least in part on the determination that the at least one ProSe relay wireless devices supports the multicast transmission of multimedia content, the at least one ProSe relay wireless device to receive the multicast transmission of multimedia content.

26. The apparatus of claim 22, further comprising:

means for receiving a plurality of discovery messages broadcast from a plurality of ProSe relay wireless devices;

means for determining that the plurality of discovery messages broadcast from the plurality of ProSe relay wireless devices fail to include an indication that the plurality of ProSe relay wireless devices support the multicast transmission of multimedia content associated with the group identity parameter; and means for sending a request message via a first ProSe relay wireless device in response to the determining, the request message requesting support of the multicast transmission of multimedia content associated with the group identity parameter.

27. The apparatus of claim 26, further comprising:

means for determining that a subsequent discovery message broadcast from the at least one ProSe relay wireless device comprises an indication that the at least one ProSe relay wireless device supports the multicast transmission of multimedia content associated with the group identity parameter; and means for selecting the at least one ProSe relay wireless device to receive the multicast transmission of multimedia content.

28. The apparatus of claim 26, wherein the at least one ProSe relay wireless device is the first ProSe relay wireless device.

29. A non-transitory computer-readable medium storing computer-executable code for wireless communication, the code executable by a processor to:

receive a discovery message broadcast from at least one ProSe relay wireless device;

identify, by a first wireless device, a group identity parameter associated with a multicast transmission of multimedia content;

determine that the discovery message comprises an indication of whether the at least one ProSe relay wireless device supports the multicast transmission of multimedia content associated with the group identity parameter;

send a temporary mobile group identity (TMGI) monitor request that comprises the group identity parameter;

receive, in response to the TMGI monitor request, a response from the at least one first ProSe relay wireless device, wherein the response comprises an identification parameter associated with the at least one ProSe relay wireless device;

map the identified group identity parameter to the identification parameter; and receive, subsequent to the determining, the multicast transmission of the multimedia content via the at least one ProSe relay wireless device based on the mapping of the identified group identity parameter to the identification parameter.

* * * * *